(12) United States Patent
Daikuhara

(10) Patent No.: US 6,402,386 B1
(45) Date of Patent: Jun. 11, 2002

(54) RETAINER FOR ROLLING BEARING

(75) Inventor: Yutaka Daikuhara, Nagano-ken (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/593,455

(22) Filed: Jun. 14, 2000

(30) Foreign Application Priority Data

Jul. 14, 1999 (JP) .......................................... 11-200326

(51) Int. Cl.$^7$ ............................................. F16C 33/38
(52) U.S. Cl. ...................................... 384/470; 384/523
(58) Field of Search ................................ 384/470, 523, 384/526, 527, 531, 532, 533, 534

(56) References Cited

U.S. PATENT DOCUMENTS

| | | | |
|---|---|---|---|
| 3,743,369 A | * | 7/1973 | Langstrom .................. 384/470 |
| 4,938,613 A | * | 7/1990 | Griffin et al. ................ 384/526 |
| 4,941,759 A | * | 7/1990 | Dreschmann et al. ....... 384/531 |
| 5,137,376 A | * | 8/1992 | Gutsche et al. ............. 384/470 |
| 5,957,592 A | * | 9/1999 | Yamanaka .................. 384/526 |

FOREIGN PATENT DOCUMENTS

| | | | |
|---|---|---|---|
| AU | 0214827 | * 5/1958 | ................. 384/470 |
| CH | 257814 | 4/1949 | |
| DE | 3300653 | * 7/1984 | ................. 384/523 |
| DE | 19521 855 A1 | 1/1996 | |
| EP | 0 394 088 | 4/1990 | |
| EP | 0 486 218 A1 | 7/1991 | |
| JP | 61215811 | 9/1986 | |

* cited by examiner

*Primary Examiner*—Thomas R. Hannon
(74) *Attorney, Agent, or Firm*—Oliff & Berridge, PLC

(57) ABSTRACT

In the retainer 10 for a rolling bearing having the retainer comprising a plurality of pockets 21 for supporting a plurality of rolling body in the circular direction at an equal spacing on one end side of the retainer, a plurality of recessed portions 23 and 24 in communicated with both of the back face and the periphery surface are formed, and after assembling the retainer on both ends of the bearing, the lubricant is applied from the recessed portion 23 of the back face to the recessed portion 24 of the periphery side and is made to flow in the bearing approximately uniformly in the circular direction to apply the sufficient amount of lubricant in the pocket 21 of the front of the retainer 20 and the connection portion 22 to solve the variation of the bearing torque and reduce.

2 Claims, 5 Drawing Sheets

RETAINER FOR ROLLING BEARING

BACKGROUND OF THE INVENTION

1. Field of the Invention

The present invention relates to a retainer for rolling bearing, in particular, a crown-shaped retainer of balls for use of ball bearings.

2. Related Art

The ball bearing is structured to retain a plurality of balls interposed between tracks of an inner race and an outer race by a retainer at an equal spacing in a circular direction, and as the retainer, conventionally, a crown-shaped retainer (hereinafter referred to as "crown retainer") has been often used. This crown retainer comprises a plurality of pockets 2, as shown in FIG. 5 by a sign 1, at one end for retaining a plurality of balls at an equal spacing in a circular direction, and after assembling a necessary number of balls between the tracks of the inner and outer races and disposing those balls at an equal spacing in a circular direction, the crown retainer is assembled between the inner race and the outer race while directing the pockets inward, thereby the balls are housed in each of the pockets 2 of the retainer 1.

Now, in this kind of ball bearing, in order to reduce a bearing torque (friction torque) and a friction heating, after assembling of the retainer 1, a lubricant such as a grease is applied to the pockets 2 of the retainer 1 and connecting portions 3 between the pockets 2, thereby a reduction of a frictional resistance between the retainer 1 and balls and between the balls and inner, outer races has been considered, and conventionally, the application of the lubricant to the retainer 1 has been carried out from an open end side because, in a bearing for general use, an end side opposite to the side where the retainer 1 is assembled is opened.

However, recently, in a hard disc driving apparatus, a bearing integral with an outer race (hereinafter referred to as "outer race integral bearing) in which the outer race and a sleeve is structured in a unitary manner has been used. This outer race integral bearing is, as an example shown in FIG. 6 by a sign 10, structured by forming two track faces 12, 13 mutually separated in an axial direction on an inner circumferential surface of the sleeve (outer race sleeve) 11 which is sleeve and at the same time functions as outer race, while preparing a stepped shaft 14, providing one track face 15 on the periphery of a large diameter 14*a* of the shaft 14 and another track face 16 on the periphery of an inner race 17 coupled with a small diameter portion 14*b* of the shaft 14 respectively and interposing plural balls 18 between the track faces 12, 13 of the outer race side and track faces 15, 16 of the inner race side. In thus outer race integral bearing, since the balls 18 are disposed in two rows, two retainers 1 become necessary, and these retainers 1 are to be assembled in the axial direction as shown in arrows A and B in the openings of both ends of the bearing 10. In this case, since both openings of the bearing 10 finished in assembling are in a state closed by the retainers 1, it becomes impossible to apply the lubricant to the pockets 2 or connecting portions 3 through the opening opposite to the side which the retainer 1 is assembled as general bearing.

Therefore, conventionally, in the outer race integral bearing 10, after assembling the retainer 1 in the openings of both ends, the lubricant has been applied in the bearing through a tiny gap existing between the periphery of the retainer 1 and the inner circumferential surface of the outer race sleeve 11. However, since this gap is quite small, it has taken a long time for applying a necessary quantity of lubricant, which has brought a low workability. Further, it has been difficult to apply the lubricant uniformly all over the retainer 1 and the track faces 12, 13, 15 and 16, eventually a variation of the bearing torque is generated or the torque itself is threatened to be increased.

The present invention has been made to solve the above conventional problems, and a first object thereof is to provide a retainer to improve a lubricant-applying workability in a closed space of a bearing, and a second object is, in addition to the above first object, to provide a retainer enabling to apply a lubricant in a stable manner to a necessary portion in the bearing, and attain an increasing of the bearing function.

According to a first invention to attain the above first object, in a crown type of rolling bearing retainer having a plurality of pockets to support rolling element at a given spacing in the circular direction, a channel in communication with one of a periphery face or an inner circumferential face or both is provided on one side opposite to the side where the pockets are provided.

In thus formed retainer, a sufficient amount of lubricant is applied effectively in the bearing through the channel.

Further, according to a second invention to attain the second object, in the above first invention, the channel is provided in a plural number by disposing these at an equal-spacing in the circular direction.

In the retainer thus formed, it is possible to apply the lubricant approximately uniformly and sufficiently in the circular direction to the necessary portions in the retainer.

In the above first and second inventions, the channel may be provided by setting openings in an annular groove formed on the end face opposite to the side provided with the pockets or in a circular groove provided on the periphery face or inner circumferential face.

EMBODIMENT

Hereinafter, one embodiment of the present invention is explained referring to the attached drawings.

Figure 1:
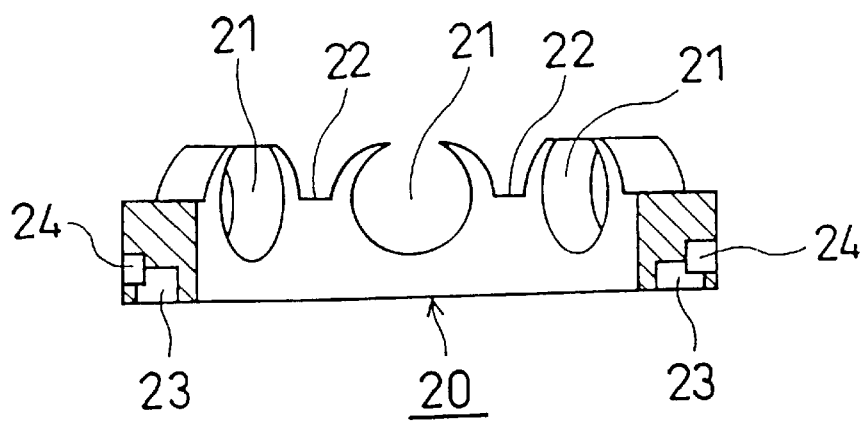
FIG. 1 is a sectional view showing the first embodiment of the present invention taken along with I—I line of FIG. 2.
Figure 2:
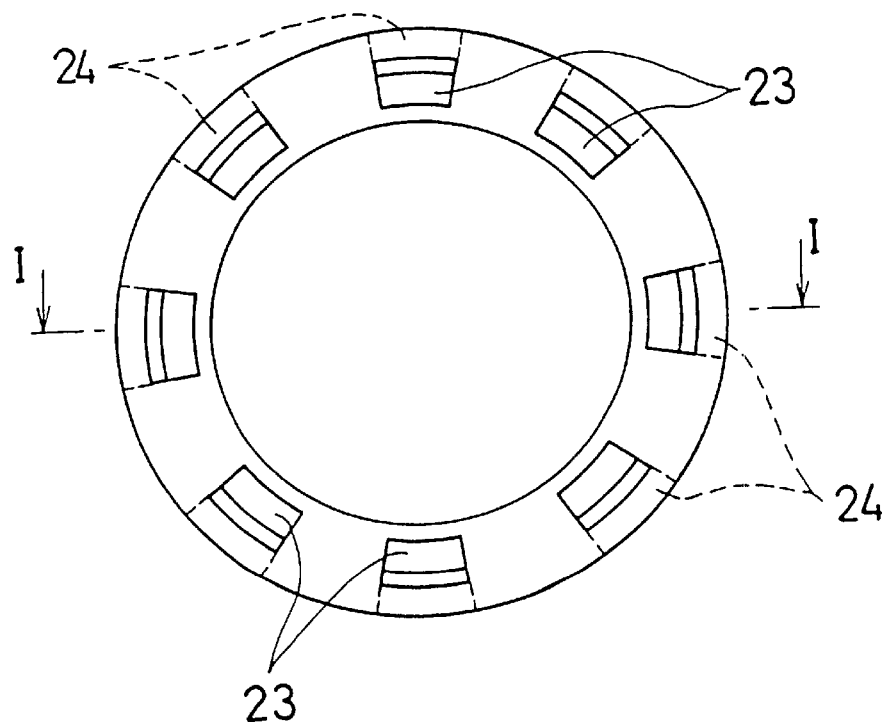
FIG. 2 is a back view of the retainer shown in FIG. 1.
Figure 3:
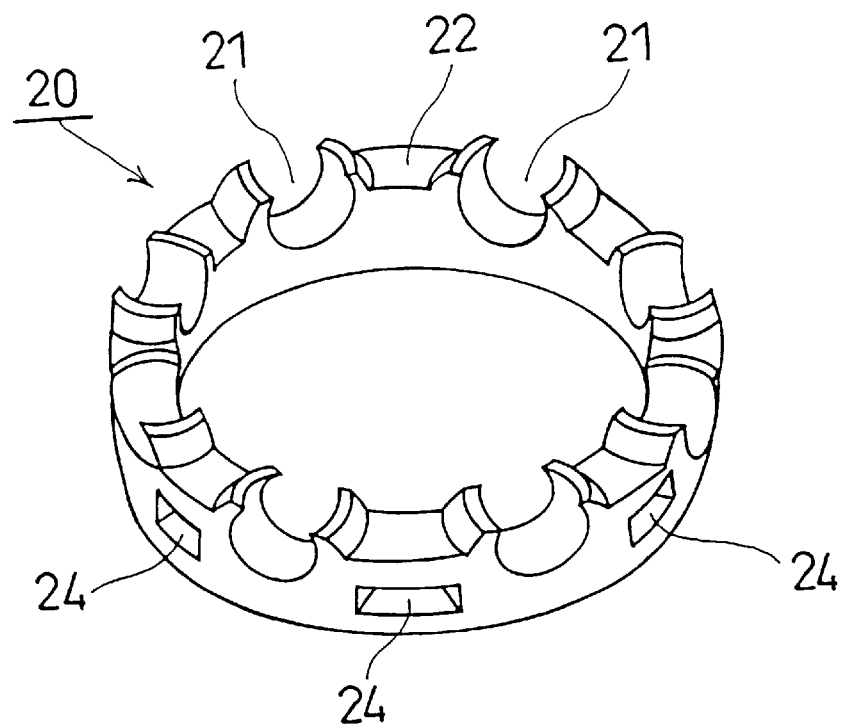
FIG. 3 is a perspective view showing the whole structure of the retainer of FIG. 1.
Figure 5:
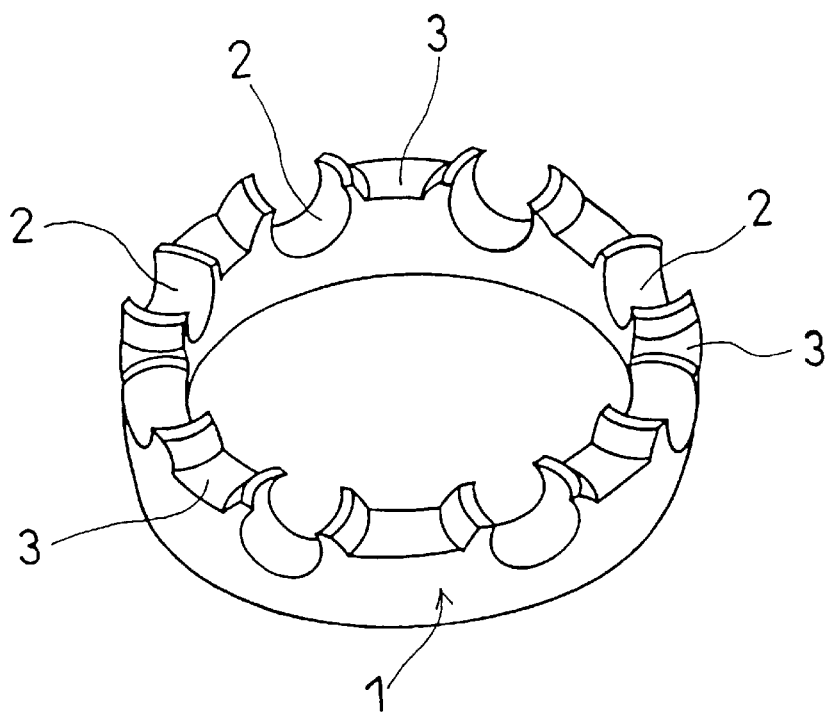
FIG. 5 is a perspective view showing the whole structure of a general and conventional crown type of retainer.

FIGS. 1 to 3 show a retainer for use of rolling bearing as the first embodiment of the present invention. The whole structure of a retainer 20 is identical with the crown type of retainer 1 shown in FIG. 5, in which a plurality of pockets 21 retaining a plurality of balls are provided on one end at an equal spacing in the circular direction, and between the adjacent pockets 21 a plane connecting portion 22 is disposed. In the first embodiment, on an end face of the retainer 20 opposite to the side where the pockets 21 are provided (hereinafter referred to as "back face"), a plurality of first recessed portions 23 (here eight) are provided on a pitch circle coaxially with the axis of the retainer at an equal spacing and on the periphery of the retainer 20 a plurality of second recessed portions 24 communicated with the first recessed portion 23 respectively are provided. That is, the retainer 20 is provided with a plurality of channels communicated through the back face and the periphery in the combination of the first recessed portion 23 and the second recessed portion 24. The retainer 20 is formed with a body molded with a resin such as a nylon 66 (trade name) and a polyphenylenesulfide (PPS), and said first and second recessed portions 23 and 24 are to be molded integrally at the time of molding the body.

Figure 6:
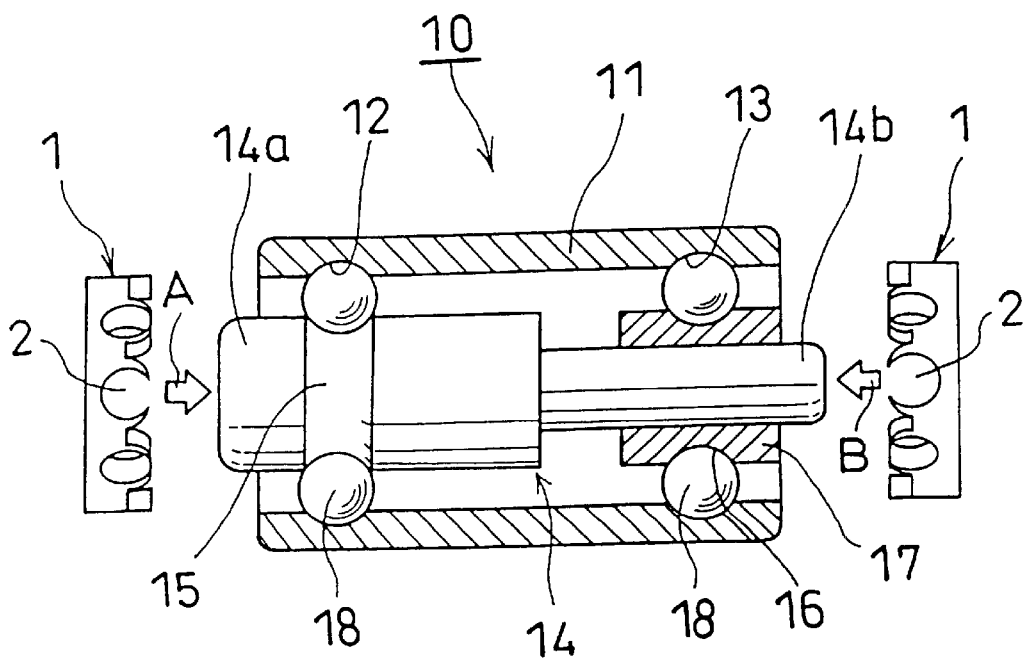
FIG. 6 is a sectional view the structure of the outer race integral type of bearing to be assembled with the crown type of retainer.

In the case where the retainer 20 is used in the outer race integral bearing, in the manner shown in FIG. 6, after the two retainers 20 are assembled in the opening through both ends of the bearing 10 in the axial direction like in the arrows A and B, the lubricant is applied from outside to the pockets 21 and the connecting portions 22 of the retainer 20. At the time of applying of the lubricant, using an appropriate supplier, the lubricant is applied to the recessed portion 23 of the back face side in order or at one time. Then, this lubricant flows from the second recessed portion 24 to the gap between the periphery of the retainer 20 and the inner circumferential surface of the outer race sleeve 11, and further into the bearing 10 through the gap, and further flows to the pocket 21 and the connecting portion 22. Then, since the channels formed with the first and second recessed portions 23 and 24 are provided in a plurality at an equal spacing in the circular direction, the lubricant flows into a front of the retainer through the channels approximately equally. As a result, since the inner face of the pocket 21 of the retainer 20 and the tracks faces 12, 13, 15, 16 of the outer race and inner race side are applied with the sufficient amount of the lubricant approximately equally and the frictional resistance between the retainer 20 and the balls 18, and between the balls 18 and each of the track faces 12, 13, 15, and 16 is reduced, the bearing 10 after being finished is without the variation and low in the bearing torque level.

Figure 4:
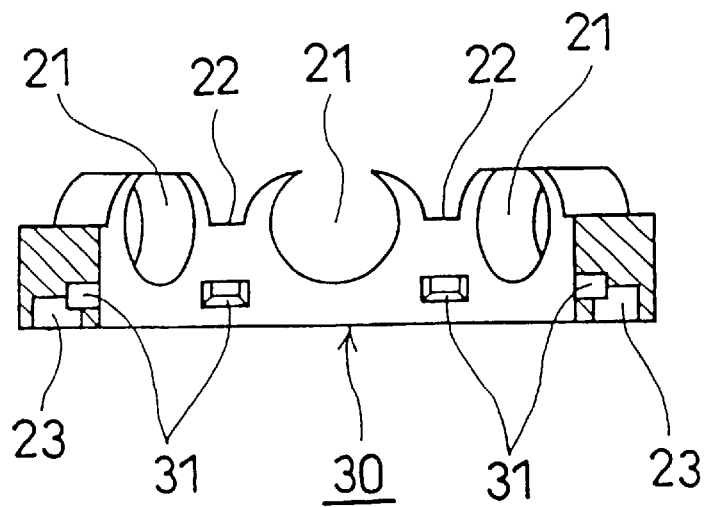
FIG. 4 is a sectional view showing the structure of the retainer for use of the rolling bearing of the second embodiment.

FIG. 4 shows a second embodiment of a retainer 30 for a rolling bearing of the present invention. Now, the whole structure of this retainer 30 is identical with the one of the retainer 20 shown in FIG. 1, so the identical portions are attached with the identical signs. The feature of the second embodiment resides in that, in place of the second recessed portion 24 of the periphery of the first embodiment, a third recessed portion 31 in communication with each first recessed portion 23 is provided on the inner circumferential surface. In this second embodiment, although the lubricant applied to the first recessed portion 23 flows in the bearing 10 through the gap between the inner circumferential surface of the retainer 30 and a large diameter portion 14a (FIG. 6) of the shaft 14 or the gap between the inner circumferential surface of the retainer 30 and the periphery of the inner race 17 (FIG. 6) coupled with the shaft 14, it is not changed from the first embodiment that the lubricant is supplied in the pocket 21 of the front side and the connecting portion 22 of the retainer 20 approximately equally in the circular direction and which plays identical effects with the first embodiment.

Figure 7:
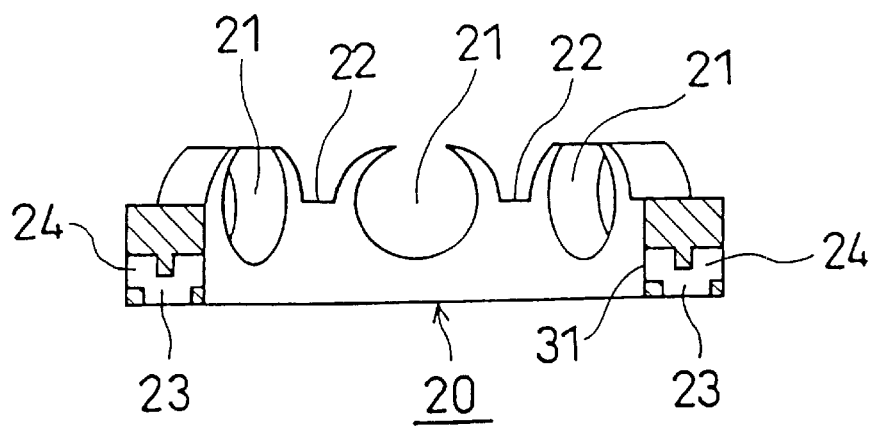
FIG. 7 is a sectional view showing a third embodiment of the present invention.

For reference, although in the first embodiment the second recessed portions 24 and in the second embodiment the third recessed portions 31 are adapted to be provided respectively on the periphery and on the inner circumferential surface. In a third embodiment of the invention, as shown in FIG. 7, these second recessed portions 24 and third recessed portions 31 may be provided together, in this case the lubricant can be applied more effectively in the bearing 10. Further, the number and shape of the recessed portions 23, 24 and 31 are free to set, not only recessed portions of less or more than 8 in number may be provided, but also the different shape such as circular and oval may be employed.

Figure 8:
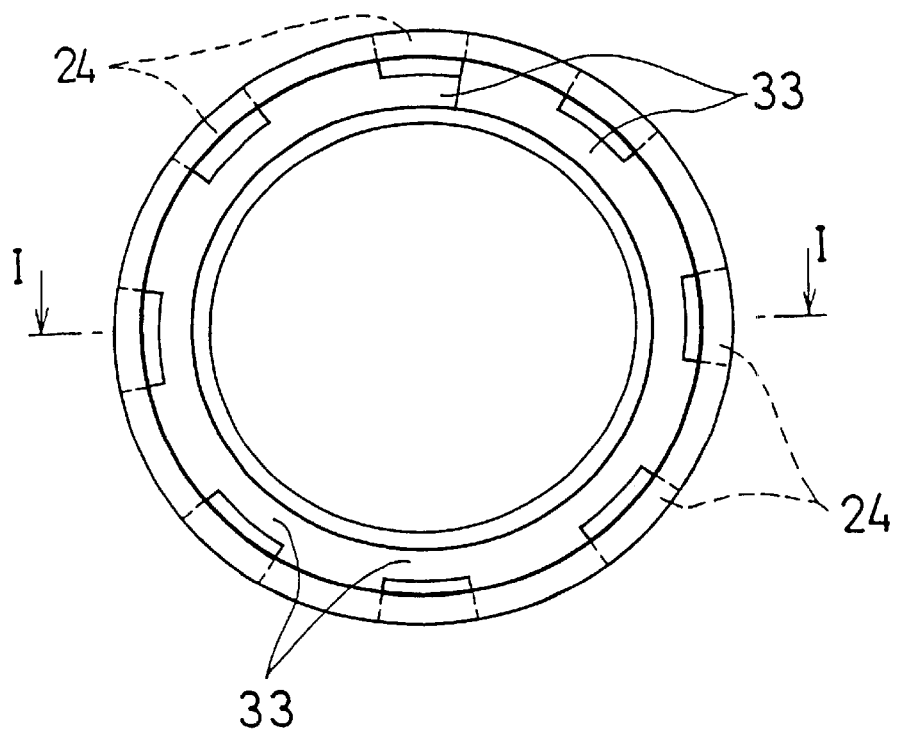
FIG. 8 is a back view of the retainer in an alternate embodiment.
Figure 9:
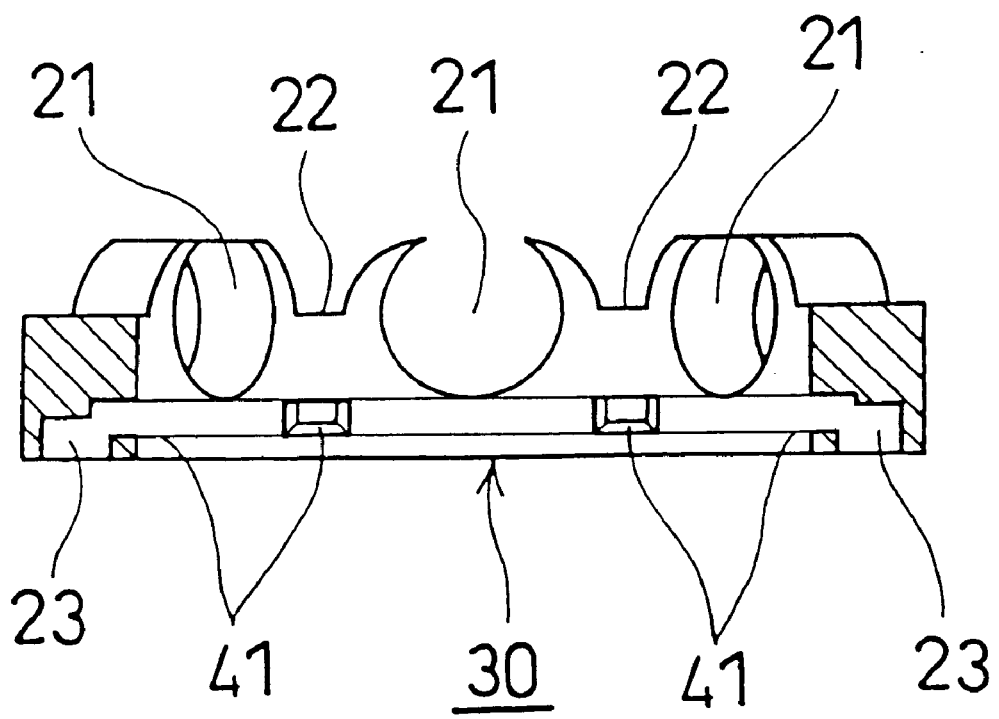
FIG. 9 is a sectional view of the retainer in another alternative embodiment

Further in the present invention, the first recessed portion 23 of the back face side may be replaced with an annular groove 33, as shown in FIG. 8 and the second and third recessed portions 24 and 31 may be replaced with a circular groove 41, as shown in FIG. 9. In the case where the first recessed portion 23 of the back face side is replaced with the annular groove 33, it is possible to apply the lubricant to each of the cannels at one time using supplier in common, and further in the case where the second and third recessed portions of the outer and inner circumferential surfaces 24 and 31 are replaced with the circular groove 41, the lubricant can be more uniformly applied in the circular direction.

According to the retainer for use of the rolling bearing of the present invention described above, since the lubricant can be applied making use of the channels in the closed space of the bearing, an applying workability is improved outstandingly to become most suitable to the outer race integral bearing.

Further, in the case where a plurality of channels are disposed in the circular direction at an equal spacing, in addition to the above improvement of the workability, the lubricant can be applied to the necessary portions in the bearing approximately uniformly to contribute to solve the variation of the bearing torque and reduce it greatly.

What is claimed is:

1. In a retainer for rolling bearing, comprising: a crown shaped retainer having a plurality of pockets at one end thereof, it is characterized in that communication channels are provided which are communicated by being opened from a side opposite to the side provided with the pockets and communicated with one of periphery or inner circumferential surface, or both, wherein the communication channels are opened in an annular groove formed on a side end opposite to the side where the pockets are provided.

2. A retainer for rolling bearing according to claim 1, wherein the communication channels are disposed in a circular direction in a plurality number at an equal spacing.

* * * * *